(12) United States Patent
Nishino et al.

(10) Patent No.: US 11,810,375 B2
(45) Date of Patent: Nov. 7, 2023

(54) TRANSACTION PROCESSING SYSTEM, TRANSACTION PROCESSING METHOD, AND NON-TRANSITORY COMPUTER-READABLE MEMORY MEDIUM

(71) Applicant: Glory Ltd., Hyogo (JP)

(72) Inventors: Kazuya Nishino, Hyogo (JP); Yukiya Tanaka, Hyogo (JP); Minoru Higashiyama, Hyogo (JP)

(73) Assignee: GLORY LTD., Hyogo (JP)

( * ) Notice: Subject to any disclaimer, the term of this patent is extended or adjusted under 35 U.S.C. 154(b) by 240 days.

(21) Appl. No.: 17/355,184

(22) Filed: Jun. 23, 2021

(65) Prior Publication Data
US 2021/0319608 A1 Oct. 14, 2021

Related U.S. Application Data

(63) Continuation of application No. PCT/JP2019/051113, filed on Dec. 26, 2019.

(30) Foreign Application Priority Data

Dec. 27, 2018 (JP) ................................ 2018-244781

(51) Int. Cl.
*G06F 3/0489* (2022.01)
*G06V 20/62* (2022.01)
(Continued)

(52) U.S. Cl.
CPC ........ *G06V 20/635* (2022.01); *G06F 3/04897* (2013.01); *G06K 19/06112* (2013.01);
(Continued)

(58) Field of Classification Search
CPC ............. G06V 20/635; G06V 2201/02; G06F 3/04897; G06K 19/06112; G06Q 20/209;
(Continued)

(56) References Cited

U.S. PATENT DOCUMENTS

| 5,897,625 A | 4/1999 | Gustin et al. |
|---|---|---|
| 7,147,147 B1 | 12/2006 | Enright et al. |

(Continued)

FOREIGN PATENT DOCUMENTS

| JP | 2004-164352 A | 6/2004 |
|---|---|---|
| JP | 2008-269186 A | 11/2008 |

(Continued)

OTHER PUBLICATIONS

Extended European search report dated Jan. 28, 2022, in corresponding European patent Application No. 19903276.4, 8 pages.

(Continued)

*Primary Examiner* — Robert J Michaud
(74) *Attorney, Agent, or Firm* — XSENSUS LLP

(57) ABSTRACT

A transaction processing system of the present disclosure includes processing circuitry configured to acquire image data of an image displayed on a display apparatus for displaying a content of a transaction; extract, from the image data, a character or graphic displayed on the display apparatus; analyze a content represented by the character or graphic; and generate instruction information, based on the analyzed content, for controlling a money processing apparatus to perform processing relating to the transaction.

16 Claims, 10 Drawing Sheets

(51) Int. Cl.
  *G06K 19/06* (2006.01)
  *G06Q 20/20* (2012.01)
  *G06Q 20/32* (2012.01)
  *G06T 11/60* (2006.01)
  *G06Q 20/10* (2012.01)

(52) U.S. Cl.
  CPC ....... *G06Q 20/209* (2013.01); *G06Q 20/3276* (2013.01); *G06T 11/60* (2013.01); *G06V 20/62* (2022.01); *G06Q 20/1085* (2013.01); *G06Q 20/208* (2013.01); *G06V 2201/02* (2022.01)

(58) Field of Classification Search
  CPC ........... G06Q 20/3276; G06Q 20/1085; G06Q 20/208; G06T 11/60
  See application file for complete search history.

(56) References Cited

U.S. PATENT DOCUMENTS

| | | |
|---|---|---|
| 7,992,776 B1 | 8/2011 | Ramachandran et al. |
| 2001/0051922 A1 | 12/2001 | Waller et al. |
| 2004/0122771 A1* | 6/2004 | Celi, Jr. ............. G06Q 20/3223 705/43 |
| 2013/0126607 A1 | 5/2013 | Behjat |
| 2017/0091765 A1* | 3/2017 | Lloyd .................. G06Q 20/321 |
| 2019/0197813 A1 | 6/2019 | Nagai et al. |

FOREIGN PATENT DOCUMENTS

| | | |
|---|---|---|
| JP | 2011-248417 A | 12/2011 |
| JP | 2012-108711 A | 6/2012 |
| WO | 98/59308 A1 | 12/1998 |
| WO | 2018/003969 A1 | 1/2018 |

OTHER PUBLICATIONS

International Search Report and Written Opinion dated Mar. 31, 2020, received for PCT Application PCT/JP2019/051113, Filed on Dec. 26, 2019, 8 pages including English Translation.

* cited by examiner

┌─────────────────────────────┐
│ ⌐ 41                        │
│                             │
│ Menu                        │
│                             │
│ 1. Deposit                  │
│ 2. Dispense   
│ 3. Report                   │
│                             │
└─────────────────────────────┘

FIG. 5A

┌─────────────────────────────┐
│ ⌐ 42                        │
│ Deposit                     │
│                             │
│ $100  ┌──────────────100─┐  │
│ $50   ├───────────────20─┤  │
│ $20   ├───────────────30─┤  │
│ $10   ├────────────────0─┤  │
│ $5    └────────────────0─┘  │
│                             │
│           [ OK  ] [ Cancel ] │
└─────────────────────────────┘

FIG. 5B

┌─────────────────────────────┐
│ ⌐ 43                        │
│ Dispense                    │
│                             │
│ $100  ┌──────────────100─┐  │
│ $50   ├────────────────0─┤  │
│ $20   ├────────────────0─┤  │
│ $10   ├────────────────0─┤  │
│ $5    └────────────────0─┘  │
│                             │
│           [ OK  ] [ Cancel ] │
└─────────────────────────────┘

FIG. 5C

| Proceeds | | $0 |
|---|---|---|
| Deposits | | $0 |
| Changes | | $0 |

| Proceeds | *Kakutei* | $10.65 |
|---|---|---|
| Deposits | | $0 |
| Changes | | $0 |

| Proceeds | $10.65 |
|---|---|
| Deposits | $20 |
| Changes | $9.35 |

TRANSACTION PROCESSING SYSTEM, TRANSACTION PROCESSING METHOD, AND NON-TRANSITORY COMPUTER-READABLE MEMORY MEDIUM

CROSS-REFERENCE TO RELATED APPLICATIONS

This application is a bypass continuation of International Patent Cooperation Treaty Application No. PCT/JP2019/051113, filed on Dec. 26, 2019, which claims priority to Japanese Patent Application No. 2018-244781, filed on Dec. 27, 2018, the entire disclosures of each are incorporated herein by reference.

BACKGROUND

A conventional automatic teller machine (ATM) comprises a banknote processing unit, a coin processing unit, a touchscreen, an interface unit, a main control unit, and a denomination-categorized storage safe. For example, in the case of depositing processing, the main control unit of the ATM displays a message prompting deposit or a button for selecting a payment amount on the touchscreen. When detecting an operation by the customer, the main control unit determines the operation content based on the touched position, and generates a depositing instruction for operating the banknote processing unit, the coin processing unit, or the like.

SUMMARY

A transaction processing system according to the present disclosure includes processing circuitry configured to acquire image data of an image displayed on a display apparatus for displaying a content of a transaction; extract, from the image data, a character or graphic displayed on the display apparatus; analyze a content represented by the character or graphic; and generate instruction information, based on the analyzed content, for controlling a money processing apparatus to perform processing relating to the transaction.

BRIEF DESCRIPTION OF THE DRAWINGS

FIG. 5A is a diagram illustrating an example of an image displayed on a display apparatus;

FIG. 5B is a diagram illustrating an example of an image displayed on the display apparatus;

FIG. 5C is a diagram illustrating an example of an image displayed on the display apparatus;

FIG. 11A is a diagram for explaining an example of an image illustrating the merchandise amount displayed on the display apparatus;

FIG. 11B is a diagram for explaining an example of an image illustrating the merchandise amount displayed on the display apparatus; and FIG. 11C is a diagram for explaining an example of an image illustrating the merchandise amount displayed on the display apparatus.

DETAILED DESCRIPTION OF THE DRAWINGS

Contents of a message displayed on the touchscreen, a shape of the button for selection, or a specification of the apparatus such as an arrangement of these differ depending on the customer such as a bank operating the ATM. Therefore, in the conventional ATM, for example, it takes much labor because it is necessary to create a function for generating instruction information of the main control unit according to the specification of the apparatus.

The inventors of the present disclosure have developed technology relating to a technique that can easily cope with the specification of the apparatus that differs for each customer, or a change in the specification of the apparatus.

A transaction processing method according to the present disclosure comprises acquiring image data of an image displayed on a display apparatus for displaying the content of a transaction, extracting a character or graphic displayed on the display apparatus from the image data, analyzing the content represented by the character or graphic, and generating instruction information for causing a money processing apparatus to perform processing relating to the transaction.

A non-transitory computer readable storage medium according to the present disclosure stores executable instructions, such as a program, that causes a computer to perform processing for acquiring image data of an image displayed on a display apparatus for displaying the content of a transaction, extracting a character or graphic displayed on the display apparatus from the image data, analyzing the content represented by the character or graphic, and generating instruction information for causing a money processing apparatus to perform processing relating to the transaction.

According to the present disclosure, it is possible to easily cope with the specification of the apparatus that differs for each customer, or the change of the specification of the apparatus.

Hereinafter, embodiments of the present disclosure will be described with reference to accompanying drawings.

Figure 1:
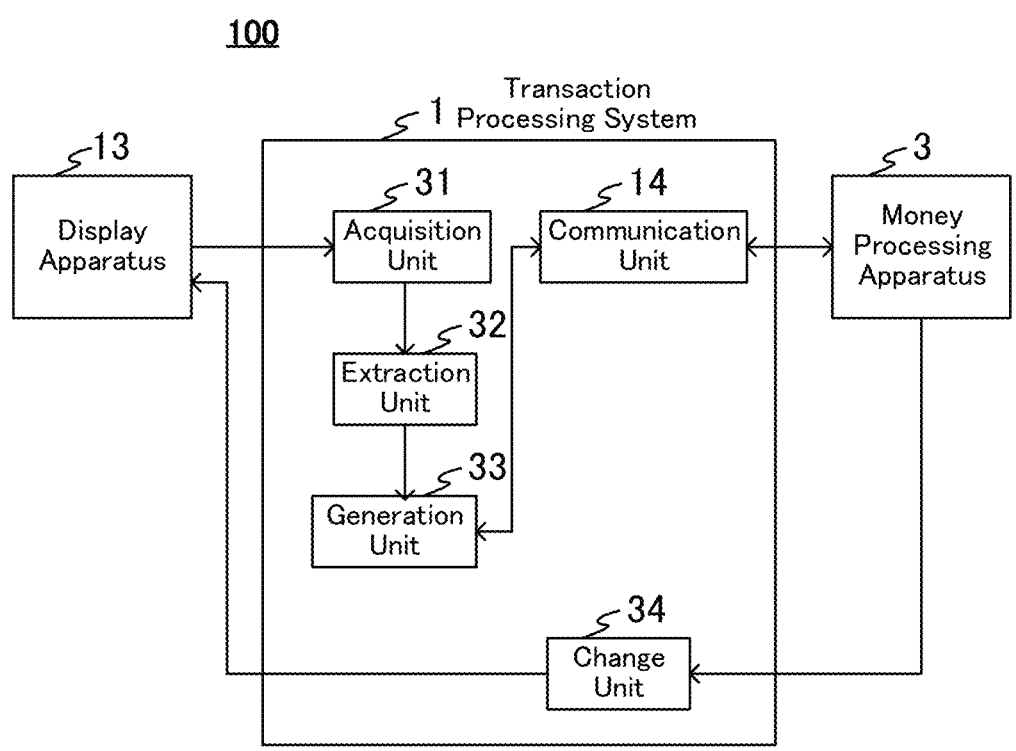
FIG. 1 is a diagram for explaining a configuration of a transaction processing system according to each embodiment of the present disclosure.

FIG. 1 is a diagram for explaining a configuration of a money processing system 100 according to each embodiment of the present disclosure described below. As illustrated in FIG. 1, the money processing system 100 comprises a transaction processing system 1, a money processing apparatus 3, and a display apparatus 13.

The transaction processing system 1 comprises at least an acquisition unit 31, an extraction unit 32, and a generation unit 33. The transaction processing system 1 may comprise at least one of a communication unit 14 and a change unit 34, if necessary.

In the transaction processing system 1, each of the communication unit 14, the acquisition unit 31, the extraction unit 32, the generation unit 33, and the change unit 34 is configured as a software module or a hardware module. For each of the communication unit 14, the acquisition unit 31, the extraction unit 32, the generation unit 33, and the change unit 34, all of them may be configured as an integrated module, or at least one module may be independent of other modules. All of the communication unit 14, the acquisition unit 31, the extraction unit 32, the generation unit 33, and the change unit 34 that configure the transaction processing system 1 may be disposed in the same location, for example, in one apparatus, as the example illustrated in FIG. 1. Alternatively, the communication unit 14, the acquisition unit 31, the extraction unit 32, the generation unit 33, and the change unit 34 that configure the transaction processing system 1 may be disposed respectively at positions apart from each other and communicatively connected to each other to configure one system.

The transaction processing system 1 and the display apparatus 13 may be apparatuses independent of each other or may be an integrated apparatus. That is, for example, the transaction processing system 1 may be incorporated in the display apparatus 13, or the display apparatus 13 may be an apparatus separate from the transaction processing system 1.

Each of the communication unit 14, the acquisition unit 31, the extraction unit 32, the generation unit 33, and the change unit 34 comprised in the transaction processing system 1 may be a module independent of the display apparatus 13 and the money processing apparatus 3. Alternatively, at least one of the communication unit 14, the acquisition unit 31, the extraction unit 32, the generation unit 33, and the change unit 34 may be incorporated in the display apparatus 13 or the money processing apparatus 3. Further, the extraction unit 32 and the generation unit 33 may be applications on a cloud, and may operate as modules configuring the transaction processing system 1 by communicating with other configurations via a network.

The display apparatus 13 is an apparatus for displaying images relating to the content of transactions such as depositing and dispensing.

The communication unit 14 is provided as necessary, between the display apparatus 13 and the acquisition unit 31, between the acquisition unit 31 and the extraction unit 32, between the extraction unit 32 and the generation unit 33, and between the generation unit 33 and the money processing apparatus 3. In the example of FIG. 1, the generation unit 33 and the money processing apparatus 3 are separate apparatuses, and the communication unit is provided between them.

The acquisition unit 31 acquires image data of an image displayed on the display apparatus 13. For example, the acquisition unit 31 may be software incorporated in the display apparatus 13, and may be software that captures the image displayed on the display apparatus 13 at a predetermined cycle. Alternatively, the acquisition unit 31 is installed outside the display apparatus 13 and may be a camera for capturing the image displayed on the display apparatus 13.

The extraction unit 32 extracts a character or graphic in the image displayed on the display apparatus 13 from the image data acquired by the acquisition unit 31.

The generation unit 33 generates instruction information for causing the money processing apparatus 3 to perform processing relating to a transaction based on the characters or graphics extracted by the extraction unit 32. The change unit 34 generates change information for changing the image to be displayed on the display apparatus 13 based on the processing result of the money processing apparatus 3.

The basic configuration of the money processing system 100 according to each embodiment of the present disclosure has been described above. In the following, in first and second embodiments, the money processing system 100 according to the present disclosure will be described in detail.

First Embodiment

Figure 2:
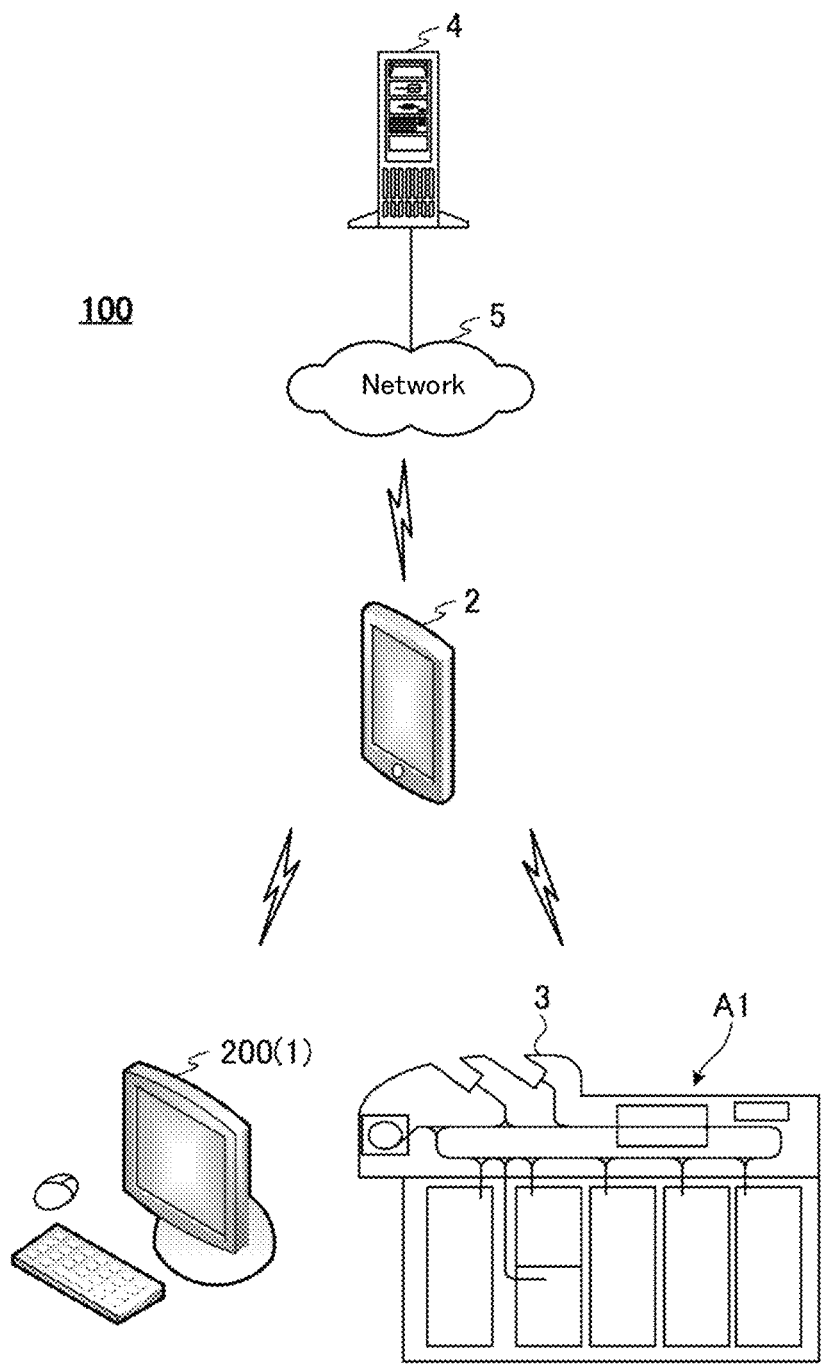
FIG. 2 is a diagram illustrating an example of the transaction processing system according to a first embodiment.

FIG. 2 is a diagram illustrating an example of the money processing system 100 according to the first embodiment. As illustrated in FIG. 2, the money processing system 100 comprises an information processing apparatus 200, a mobile terminal 2, the money processing apparatus 3, and a server 4. The transaction processing system 1 is incorporated in the information processing apparatus 200. FIG. 2 illustrates a network 5. The network 5 is, for example, a wireless communication network such as a cellular phone and a network comprising the Internet. The information processing apparatus 200, the mobile terminal 2, and the money processing apparatus 3 are installed in a facility such as a bank, for example. The server 4 may be installed in a facility different from the information processing apparatus 200 and the mobile terminal 2, or may be installed in the same facility.

The information processing apparatus 200 is, for example, a terminal apparatus such as a personal computer. The information processing apparatus 200 performs wireless communication with the mobile terminal 2 by using a communication method such as Bluetooth (registered trademark) or Wi-Fi (registered trademark). The information processing apparatus 200 is operated by, for example, a bank clerk. The information processing apparatus 200 incorporates the transaction processing system 1 described above.

The mobile terminal 2 is, for example, a mobile terminal apparatus such as a smart phone or a tablet terminal. The mobile terminal 2 performs wireless communication with the information processing apparatus 200 and the money processing apparatus 3 using, for example, a communication method such as Bluetooth or Wi-Fi. The mobile terminal 2 is connected to the network 5, for example, by the wireless communication or wire communication, and performs wireless communication with the server 4.

The money processing apparatus 3 is an apparatus for performing at least one of a depositing processing and a dispensing processing. The money processing apparatus 3 is, for example, a Teller Cash Recycler (TCR). The money processing apparatus 3 performs the wireless communication with the mobile terminal 2 by using, for example, a communication method such as Bluetooth or Wi-Fi.

The server 4 is, for example, a server that manages an account of a customer of a bank. The server 4 communicates with the mobile terminal 2 via the network 5.

When communicating with the server 4, the information processing apparatus 200 communicates via the mobile terminal 2. When communicating with the server 4, the money processing apparatus 3 communicates via the mobile terminal 2. That is, the information processing apparatus 200 and the money processing apparatus 3 do not directly connect to the network 5, but connect to the network 5 through the mobile terminal 2 to communicate with the server 4.

The information processing apparatus 200 and the money processing apparatus 3 are installed, for example, in a counter of the bank. The information processing apparatus 200 is disposed, for example, near the money processing apparatus 3. For example, the information processing apparatus 200 may be disposed on a desk disposed next to the money processing apparatus 3. The information processing apparatus 200 may be disposed on a flat upper portion of the money processing apparatus 3 indicated by an arrow A1 in FIG. 2. The mobile terminal 2 is disposed in a range in which it can wirelessly communicate with the information processing apparatus 200 and the money processing apparatus 3, and is disposed in a range in which it can be connected to the network 5.

The money processing apparatus 3 stores the money input to the depositing port of the money processing apparatus 3 in a storage box in the apparatus, for example, in accordance with the instruction information from the transaction processing system 1 incorporated in the information processing apparatus 200. The money processing apparatus 3 returns the result of the depositing processing, such as the number of currencies deposited for each denomination, to the transaction processing system 1 via the mobile terminal 2. In the present disclosure, a "number of currencies" refers to a number of tokens, bills or other currencies and legal tender for deposit, dispense, withdrawal or use in a transaction.

The transaction processing system 1 displays the result of the depositing processing on the display apparatus 13 of the information processing apparatus 200. The information processing apparatus 200 transmits the result of the depositing processing received from the money processing apparatus 3 to the server 4 via the mobile terminal 2.

The money processing apparatus 3, for example, dispenses money stored in the storage box in the apparatus to a dispensing port of the money processing apparatus 3 in accordance with the instruction information from the transaction processing system 1. The money processing apparatus 3 returns the result of the dispensing processing, such as the number of currencies dispensed for each denomination, to the transaction processing system 1 via the mobile terminal 2. The transaction processing system 1 displays the result of the dispensing processing on the display apparatus 13 of the information processing apparatus 200. The information processing apparatus 200 transmits the result of the dispensing processing received from the money processing apparatus 3 to the server 4 via the mobile terminal 2.

Figure 3:
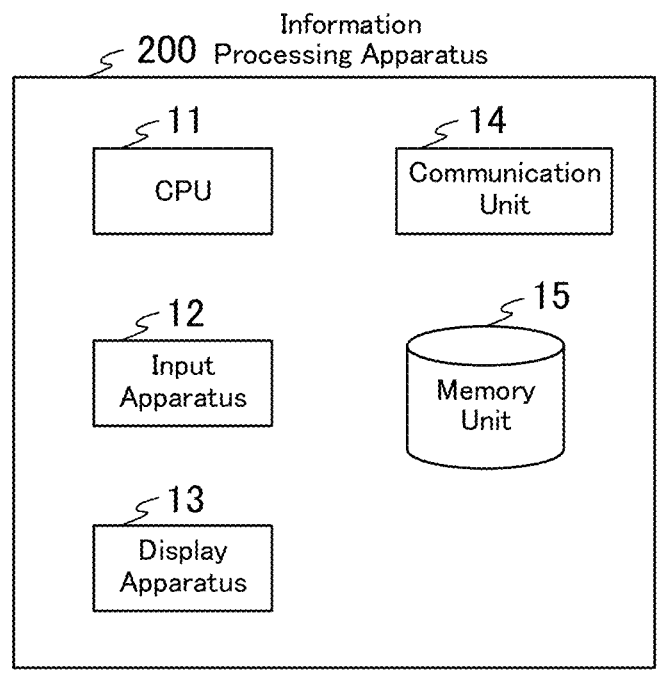
FIG. 3 is a diagram illustrating a configuration example of hardware blocks of an information processing apparatus according to the first embodiment.

FIG. 3 is a diagram illustrating a configuration example of hardware blocks of the information processing apparatus 200 according to the first embodiment. As illustrated in FIG. 3, the information processing apparatus 200 comprises a Central Processing Unit (CPU) 11, an input apparatus 12, the display apparatus 13, the communication unit 14, and a memory unit 15.

The functionality of information processing apparatus 200 and its sub-elements may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In an exemplary implementation, the CPU 11 is processing circuitry that controls entire of the information processing apparatus 200. The input apparatus 12 is, for example, a keyboard, a mouse, and the like for accepting an operation of the bank clerk (hereinafter, it may be referred to as a user). The input apparatus 12 may be a touchscreen superimposed on the display surface of the display apparatus 13. The input apparatus 12 outputs information corresponding to the operation received from the user to the CPU 11.

The display apparatus 13 displays a video based on the digital video data output from the CPU 11. The display apparatus 13 is, for example, a liquid crystal display.

The communication unit 14 performs the wireless communication with the mobile terminal 2. The communication unit 14 transmits the information output from the CPU 11 to the mobile terminal 2. The communication unit 14 outputs the information received from the mobile terminal 2 to the CPU 11.

The memory unit 15 stores a program for operating the CPU 11. The memory unit 15 stores data for the CPU 11 to perform calculation processing or data for controlling each unit. The memory unit 15 may be configured by a storage apparatus such as a Random Access Memory (RAM), a Read Only Memory (ROM), a flash memory, a Hard Disk Drive (HDD) and the like.

Figure 4:
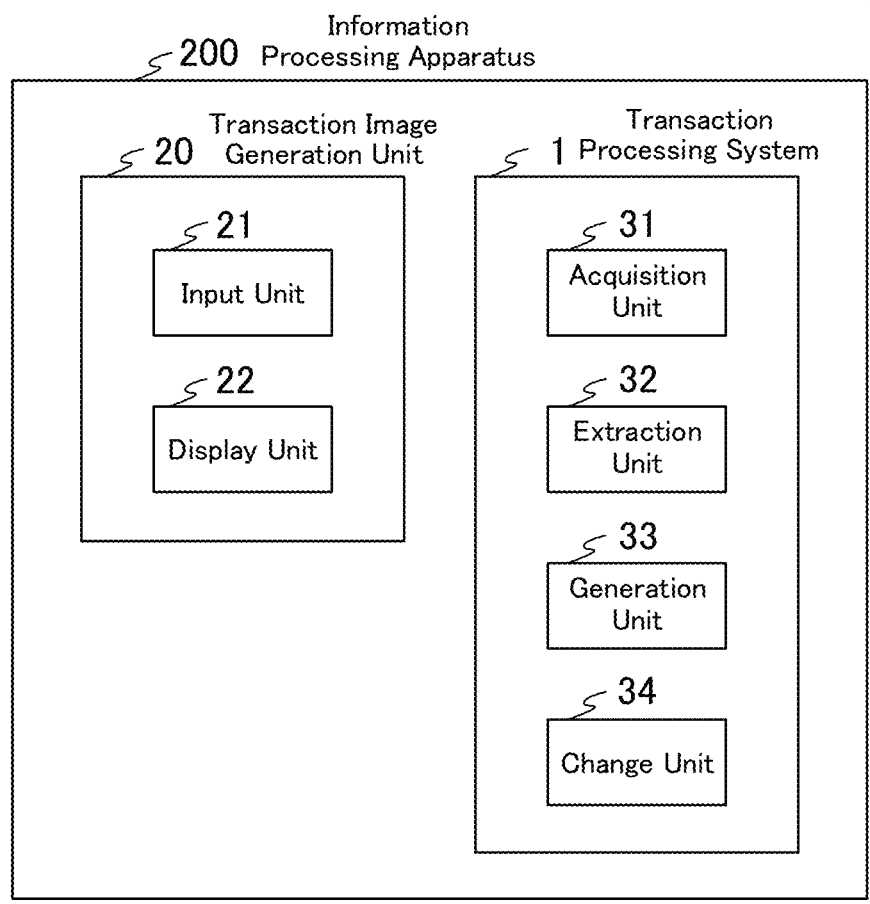
FIG. 4 is a diagram illustrating a configuration example of functional blocks of the information processing apparatus according to the first embodiment.

FIG. 4 is a diagram illustrating a configuration example of functional blocks of the information processing apparatus 200 according to the first embodiment. The functional block illustrated in FIG. 4 is realized, for example, by the CPU 11 executing the program stored in the memory unit 15. As illustrated in FIG. 4, the information processing apparatus 200 comprises a transaction image generation unit 20 and the transaction processing system 1. The functions of the transaction image generation unit 20 and the functions of the transaction processing system 1 are realized by different programs. For example, the function of the transaction image generation unit 20 is realized by a transaction image program, and the function of the transaction processing system is realized by a transaction processing program.

The transaction image generation unit 20 displays a menu image relating to transactions such as depositing and dispensing, an image relating to the depositing processing, an image relating to the dispensing processing, and the like on the display apparatus 13. The transaction image generation unit 20 comprises an input unit 21 and a display unit 22. The input unit 21 receives information transmitted from the input apparatus 12.

The display unit 22 displays an image corresponding to the information received by the input unit 21 on the display apparatus 13. For example, the display unit 22 displays the menu image on the display apparatus 13. The user operates the input apparatus 12 to click on a certain menu among a plurality of menus displayed on the menu image. The input unit 21 receives information corresponding to the clicked menu from the input apparatus 12. The display unit 22 displays an image corresponding to the information received by the input unit 21 on the display apparatus 13. The input unit 21 comprises, for example, a keyboard interface that receives data input from a keyboard and transmits the received data to the CPU 11. As long as the data is for the keyboard interface, it can be accepted even if it is input from a device other than the keyboard.

The transaction processing system 1 determines the operation of the user based on the image data of the image displayed on the display apparatus 13 by the transaction image generation unit 20. The transaction processing system 1 generates the instruction information to the money processing apparatus 3 corresponding to the determined operation of the user. The transaction processing system 1 comprises the acquisition unit 31, the extraction unit 32, and the generation unit 33. The transaction processing system 1 may further comprise the change unit 34. For example, the acquisition unit 31, the extraction unit 32, the generation unit 33, and the change unit 34 may be software stored in the memory unit 15 and operated by the CPU 11. In this case, the acquisition unit 31 and the extraction unit 32 are software for image processing.

In an exemplary implementation, the processing circuitry of information processing apparatus 200 is configured to encompass the acquisition unit 31, the extraction unit 32, and the generation unit 33. In other implementations, information processing apparatus 200 includes processing circuitry that encompasses the acquisition unit 31, processing circuitry that encompasses the extraction unit 32, and processing circuitry that encompasses the generation unit 33.

The acquisition unit 31 acquires the image data of an image displayed on the display apparatus 13. For example, the acquisition unit 31 acquires the image data of an image displayed on the display apparatus 13 at a predetermined cycle of several milliseconds to several hundreds of milliseconds.

The extraction unit 32 extracts a changed character or graphic among the character or graphic inside the image displayed on the display apparatus 13 from the image data acquired by the acquisition unit 31. The graphic comprises a symbol and the like. The change of the character or graphic comprises an event in which a character or graphic is displayed in areas that nothing is displayed (for example, a blank area of a text box).

For example, the user clicks on the certain menu (a letter of the certain menu) of the menu image displayed on the display apparatus 13. The display 22 changes, for example, the color of the letter of the certain menu clicked by the user to indicate that the user clicked the certain menu. Alternatively, the display unit 22, for example, shifts the position of the character of the certain menu slightly while a button of the mouse is pressed to indicate that the user clicked (the display unit 22 slightly shifts the position of the character of the certain menu to indicate that the certain menu is clicked by the user). The extraction unit 32 extracts the character whose color has changed or the character whose position has changed in this manner. Further, for example, when the user inputs the amount of money to be deposited or dispensed, the input amount is displayed in a predetermined area of the image displayed on the display apparatus 13. The extraction unit 32 extracts the newly displayed character and the position where the character is displayed.

The dictionary data is stored in the memory unit 15. The extraction unit 32 refers to the dictionary data and extracts the character or graphic comprised in the image displayed on the display apparatus 13. Further, the extraction unit 32 may extract a change of characters or graphics comprised in a certain image frame and an image frame at least one or more preceding the certain image frame (the change of the image of the character or graphic).

The generation unit 33 generates the instruction information corresponding to the operation performed on the input apparatus 12 by the user from the changed character or graphic extracted by the extraction unit 32. For example, the generation unit 33 refers to the dictionary data stored in the memory unit 15, analyzes the content represented by the character or graphic extracted by the extraction unit 32, and generates the instruction information corresponding to the analyzed content.

Specifically, the character of the menu clicked by the user in the menu image is displayed as "deposit". In this instance, the extraction unit 32 extracts the characters "deposit" from the images acquired by the acquisition unit 31, and the generation unit 33 generates the instruction data of the depositing processing based on the extracted characters "deposit". The generation unit 33 transmits the generated instruction information to the money processing apparatus 3 via the communication unit 14.

The money processing apparatus 3 returns the result of the instruction information to the transaction processing system 1 according to the type of the instruction information transmitted from the transaction processing system 1 incorporated in the information processing apparatus 200. For example, the money processing apparatus 3, when receiving the instruction information of the depositing processing from the transaction processing system 1, aggregates the number of currencies inserted into the depositing port categorized by denomination, returns the aggregation result to the transaction processing system 1.

The communication unit 14 receives the result transmitted from the money processing apparatus 3. Based on the result received by the communication unit 14, the change unit 34 inputs data for changing (overwriting) the image displayed on the display apparatus 13 (the image that the display unit 22 displays on the display apparatus 13) to the input unit 21 of the transaction image generation unit 20. At this time, the change unit 34 may change this data to data of a data format for the keyboard interface of the input unit 21. Thus, the input unit does not need to comprise a special interface for processing data input from the change unit 34.

For example, the communication unit 14 receives the number of currencies for each denomination aggregated by the money processing apparatus 3 in the depositing processing from the money processing apparatus 3. The change unit 34 inputs data for overwriting the number of currencies for each denomination in the depositing processing received by the communication unit 14 at a predetermined position of the image displayed on the display apparatus 13 to the input unit 21 of the transaction image generation unit 20.

FIG. 5A is a diagram illustrating an example of the image displayed on the display apparatus 13. The image 41 of FIG. 5A is an example of the menu image displayed on the display apparatus 13. The image 41 is displayed on the display apparatus 13 by the display unit 22.

Characters "Menu" indicating that the image 41 is a menu image are comprised at the upper left portion of the image 41. The image 41 comprises three menus as "1. Deposit", "2. Dispense", and "3. Report".

The image 41 comprises a pointer. The pointer moves on the image 41 in response to the operation of the user to the input apparatus 12. For example, the input unit 21 receives information corresponding to the pointer operation by the user from the input apparatus 12. The display unit 22 moves the pointer on the image 41 in accordance with the information received by the input unit 21.

The acquisition unit 31 acquires the image data of the image 41 displayed on the display apparatus 13 at predetermined interval. The extraction unit 32 extracts the character or graphic from the image data acquired by the acquisition unit 31. The extraction unit 32 may extract a changed character or graphic among the character or graphic displayed in the image 41.

For example, the user operates the input apparatus 12 to move the pointer displayed in the image 41 onto the menu "1. Deposit", and clicks it (the user selects the depositing processing). The display unit 22 changes, for example, the color of the characters "1. Deposit" in the image 41 to indicate that the menu "1. Deposit" has been clicked (selected) by the user. For example, the display unit 22 changes the color of the characters "1. Deposit" displayed in black to the characters "1. Deposit" in red when clicked. The extraction unit 32 extracts the color-changed characters "1. Deposit" from the image data acquired by the acquisition unit 31 at the predetermined cycle.

The generation unit 33 generates the instruction information of the money processing apparatus 3 corresponding to the operation performed on the input apparatus 12 by the user, based on the changed character or graphic extracted by the extraction unit 32. At this time, the generation unit 33 may analyze the content represented by the image 41 based on the character or graphic comprised in the image 41, and generate the instruction information corresponding to the analyzed content.

For example, the characters "Menu" indicating that the image 41 is the menu image is comprised in the image 41. Further, the image 41 comprises the characters "1. Deposit", the characters "2. Dispense", and the characters "3. Report". The generation unit 33 determines that the image 41 is the menu image based on these characters. When the characters "1. Deposit" changes in the menu image, the generation unit 33 determines that the user has selected the depositing processing in the menu image, and generates the instruction information for the depositing processing.

When generating the instruction information of the depositing processing, the generation unit 33 outputs the generated instruction information to the communication unit 14. The communication unit 14 transmits the instruction information of the depositing processing output from the generation unit 33 to the mobile terminal 2. The mobile terminal 2 transmits the instruction information of the depositing processing to the money processing apparatus 3.

When receiving the instruction information of the depositing processing, the money processing apparatus 3 executes the depositing processing of the currency inserted into the depositing port, and transmits the processing result of the depositing processing to the mobile terminal 2. The processing result of the depositing processing comprises, for example, the number of currencies for each denomination accepted as the deposited currency. For example, the results of the depositing processing comprise information such as 100 sheets of 100 dollar banknotes, 20 sheets of 50 dollar banknotes, 30 sheets of 20 dollar banknotes, 0 sheets of 10 dollar banknotes, and 0 sheets of 5 dollar banknotes.

The mobile terminal 2 transmits the result of the depositing processing transmitted from the money processing apparatus 3 to the information processing apparatus 200. The communication unit 14 of the information processing apparatus 200 receives the result of the depositing processing transmitted from the mobile terminal 2.

Here, while the generation unit 33 of the transaction processing system 1 generates the instruction information to the money processing apparatus 3, the display unit 22 of the transaction image generation unit 20 shifts the image of the display apparatus 13 to the image of the depositing processing in response to the click operation of the menu "1. Deposit" in the image 41.

FIG. 5B is a diagram illustrating an example of the image displayed on the display apparatus 13. The image 42 in the FIG. 5B is an example of the image of the depositing processing displayed on the display apparatus 13. The image 42 is displayed on the display apparatus 13 when the menu "1. deposit" comprised in the image 41 of FIG. 5A is clicked. The image 42 is displayed on the display apparatus 13 by the display unit 22.

Characters "Deposit" indicating that the image 42 is an image of the depositing processing are comprised at the upper left portion of the image 42. Further, the image 42 comprises characters "$100", "$50", "$20", "$10", and "$5" indicating the denomination of the currency. Further, the image 42 comprises a box (a square graphic) in which the number of currencies by denomination of which the money processing apparatus 3 has executed the depositing processing is displayed. In addition, a button for settling the depositing processing (characters "OK" of the image 42), and a button for canceling the depositing processing (characters "Cancel" of the image 42) is comprised at the lower left portion of the image 42.

The change unit 34 inputs data for overwriting the image 42 displayed by the display unit 22 to the input unit 21 of the transaction image generation unit 20 based on the result of the depositing processing received by the communication unit 14. For example, the change unit 34 analyzes the content represented by the character or graphic comprised in the image 42, and decides the position at which the information based on the result of the depositing processing is overwritten on the image 42 based on the analyzed content.

More specifically, the change unit 34 determines that the image 42 is an image of the depositing processing based on the characters "Deposit" comprised in the image 42, the characters "$100", "$50", "$20", "$10", and "$5", and the box of the graphic. Then, the change unit 34 overwrites the number of currencies in the boxes, based on the result of the depositing processing transmitted from the money processing apparatus 3 from the characters "$100", "$50", "$20", "$10", and "$5" indicating the denomination of the coins, and the boxes displayed corresponding to the characters indicating the denomination. When the result of the depositing processing transmitted from the money processing apparatus 3 is the information such as 100 sheets of 100 dollar banknotes, 20 sheets of 50 dollar banknotes, 30 sheets of 20 dollar banknotes, 0 sheets of 10 dollar banknotes, and 0 sheets of 5 dollar banknotes, the change unit 34 overwrites the characters "100" in the box corresponding to the characters "$100" in the image 42. In addition, the change unit 34 overwrites the characters "20" in the box corresponding to the characters "$50" of the image 42. The change unit 34 overwrites the characters" 30" in the box corresponding to the characters" $20" of the image 42. The change unit 34 overwrites the characters" 0" in the box corresponding to the characters" $10" of the image 42. The change unit 34 overwrites the characters" 0" in the box corresponding to the characters" $5" of the image 42. Here, the change unit 34 may change the format of the data input to the input unit 21 of the transaction image generation unit 20 to the data format for the keyboard interface of the input unit 21. Thus, the display unit 22 can overwrite the image 42 by the information based on the result of the depositing processing, as in the case where the result of the depositing processing is input from the keyboard.

The user settles the number of currencies written in the box of the image 42, moves the pointer over the button for settling the depositing processing and clicks it, when settling the depositing processing.

The extraction unit 32 extracts a change of the clicked button. The generation unit 33 determines that the user has performed the settlement operation of the depositing processing in the image of the depositing processing, and generates the instruction information for settling the deposition, when the button for settling the depositing processing has changed in the image of the depositing processing. The communication unit 14 transmits the instruction information for settling the deposition generated by the generation unit 33 to the mobile terminal 2. When receiving the instruction information for settling the deposition, the mobile terminal 2 transmits the instruction information for settling the deposition to the money processing apparatus 3. The money processing apparatus 3 terminates the depositing processing in response to the reception of the instruction information for settling the deposition.

The input unit 21 transmits the result of the depositing processing (information relating to the number of currencies for each denomination of currency) of the money processing apparatus 3 to the mobile terminal 2 via the communication unit 14 in response to the settlement operation of the depositing processing (click operation of the OK button). The mobile terminal 2 transmits the result of the depositing processing transmitted from the transaction processing system 1 incorporated in the information processing apparatus 200 to the server 4.

FIG. 5C is a diagram illustrating an example of the image displayed on the display apparatus 13. The image 43 in F 5C is an example of the image of the dispensing processing displayed on the display apparatus 13. The image 43 is displayed on the display apparatus 13 when the menu "2. Dispense" comprised in the image 41 of FIG. 5A is clicked. The image 43 is displayed on the display apparatus 13 by the display unit 22.

Characters "Dispense" indicating that the image 43 is an image of the dispensing processing are comprised at the upper left portion of the image 43. Further, characters "$100", "$50", "$20", "$10", and "$5" indicating the denomination of the currency are comprised in the image 43. Further, the image 43 comprises a text box (a square graphic) for accepting the number of currencies by denomination dispensed from the money processing apparatus 3. In addition, a button for starting the dispensing processing (characters "OK" of the image 42), and a button for canceling the dispensing processing (characters "Cancel" of the image 43) is comprised at the lower left portion of the image 43.

The display unit 22 displays the number of currencies to be dispensed in the text box in accordance with the operation accepted by the input unit 21. For example, the user operates the input apparatus 12, positions the pointer on the text box corresponding to the characters "$100", and clicks it. The display unit 22 displays a cursor in the text box corresponding to the characters "$100". The user operates the input apparatus 12 to input the number "100" of currencies to be dispensed in the text box corresponding to the characters "$100". The display unit 22 displays the characters "100" in the text box corresponding to the characters "$100" according to the number "100" input by the user.

The acquisition unit 31 acquires the image data of the image 43 displayed on the display apparatus 13 at the predetermined interval. The extraction unit 32 extracts the changed character or graphic among the character or graphic comprised in the image 43 from the image data acquired by the acquisition unit 31.

The generation unit 33 generates the instruction information of the money processing apparatus 3 corresponding to the operation performed on the input apparatus 12 by the user, from the changed characters or graphics extracted by the extraction unit 32. At this time, the generation unit 33 may analyze the content represented by the image based on the character or graphic comprised in the image 43, and generate the instruction information corresponding to the analyzed content.

For example, the image 43 comprises a characters "Dispense" indicating that the image 43 is an image of the dispensing processing. The image 43 comprises characters "$100", "$50", "$20", "$10", and "$5" indicating the denomination of the currency, and the text box. In addition, the image 43 comprises a button for settling the dispensing processing and a button for canceling the dispensing processing. The generation unit 33 determines that the image 43 is the image of the dispensing processing based on these characters. Then, when the button for settling the dispensing processing changes in the image of the dispensing processing, the generation unit 33 determines that the user has selected the depositing processing in the menu image. For example, the generation unit 33 acquires the denomination of the currency comprised in the image 43 and the character in the text box corresponding to the denomination of the currency, and generates the instruction information comprising of the dispensing processing comprising the acquired denomination of the currency and the number of currencies by denomination.

When the user inputs the number of currencies to be dispensed in the text box, the character in the text box changes (the character is displayed from the state where there is no character). In this case, the extraction unit 32 extracts the character in the text box, but the generation unit 33 does not generate the instruction information. When the character in the text box changes in the image for performing the dispensing processing, the generation unit 33 determines that the number of currencies to be dispensed has been written, and does not generate the instruction information. As described above, when the operation for settling the dispensing processing is extracted by the extraction unit 32 in the image for performing the dispensing process, the generation unit 33 generates the instruction information of the dispensing processing comprising the denomination of the currency and the number of currencies.

Here, the image specification of the display apparatus 13 of the information processing apparatus 200 differs depending on the bank or the like. For example, the image specification such as the content of a message displayed on the display apparatus 13, the shape of the selection button, the arrangement thereof, or the like differ depending on the bank.

As described with reference to FIG. 4, the functions of the information processing apparatus 200 are divided into the transaction image generation unit 20 and the transaction processing system 1, and the functions of the transaction image generation unit 20 and the transaction processing system 1 are realized by different programs. Therefore, in the information processing apparatus 200, the program of the transaction image generation unit 20 may be created in accordance with the image specification of each bank.

As described above, in the information processing apparatus 200, the transaction processing system 1 determines the operation of the user based on the image data and generates the instruction information of the money processing apparatus 3, even if the position of the button for accepting the operation of the user differs depending on the banks. That is, the transaction processing system 1 generates the instruction information based on the image displayed on the display apparatus 13, even if there is no interface for exchanging information with the transaction image generation unit 20 (without receiving information from the CPU 11 or the input apparatus 12). For this reason, the program of the transaction processing system 1 may not be created for each bank. In addition, when the image specification of the bank is changed, the program of the transaction image generation unit 20 may be changed without changing the program of the transaction processing system 1.

Figure 6:
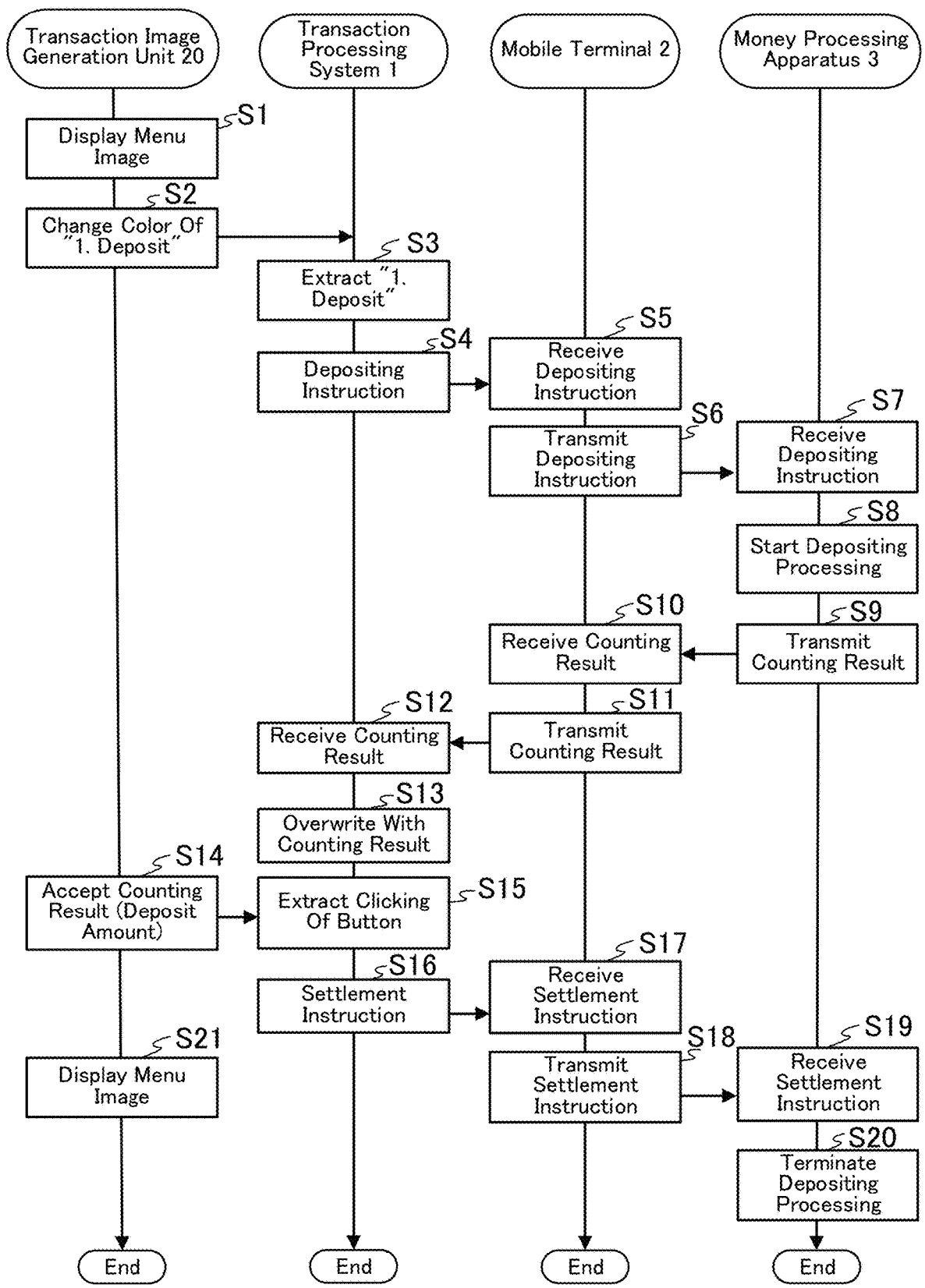
FIG. 6 is a sequence diagram illustrating an action example of the transaction processing system according to the first embodiment.

FIG. 6 is a sequence diagram illustrating an action example of the money processing system 100 according to the first embodiment. Hereinafter, the acquisition unit 31 of the transaction processing system 1 acquires the image data of the image displayed on the display apparatus 13 at the predetermined interval.

The display unit 22 of the transaction image generation unit 20 displays the menu image on the display apparatus 13 (step S1). The user operates the input apparatus 12 to move the pointer over the menu "1. Deposit" in the menu image, and clicks it.

The displaying unit 22 of the transaction image generation unit 20 changes the color of the characters "1. Deposit" in the menu image (step S2).

The extraction unit 32 of the transaction processing system 1 extracts the characters "1. Deposit" as changed characters from the image data acquired by the acquisition unit 31 (step S3).

The generation unit 33 of the transaction processing system 1 determines that the user has selected the depositing processing in the menu image based on the characters "1. Deposit" extracted by the extraction unit 32, and generates the instruction information of the depositing processing (step S4). The communication unit 14 transmits the instruction information of the depositing processing generated by the generation unit 33 to the mobile terminal 2.

The mobile terminal 2 receives the instruction information of the depositing processing (depositing instruction) transmitted from the transaction processing system 1 (step S5).

The mobile terminal 2 transmits the depositing instruction transmitted from the transaction processing system 1 to the money processing apparatus 3 (step S6).

The money processing apparatus 3 receives the depositing instruction transmitted from the mobile terminal 2 (step S7).

The money processing apparatus 3 starts the depositing processing in response to the receipt of the depositing instruction transmitted from the mobile terminal 2 (step S8).

The money processing apparatus 3 transmits the counting result for each denomination of the currency to the mobile terminal 2 (step S9).

The mobile terminal 2 receives the counting result transmitted from the money processing apparatus 3 (step S10).

The mobile terminal 2 transmits the counting result transmitted from the money processing apparatus 3 to the transaction processing system 1 (step S11).

The change unit 34 of the transaction processing system 1 receives the counting result transmitted from the mobile terminal 2 via the communication unit 14 (step S12).

The change unit 34 of the transaction processing system 1 overwrites the image displayed on the display apparatus 13 with the counting result received from the mobile terminal 2 (step S13). For example, the change unit 34 analyzes the contents represented by the character or graphic displayed on the display apparatus 13, and overwrites with the counting result at a predetermined position of the image based on the analyzed content. Here, the user operates the input apparatus 12 to move the pointer over the button for settling the counting result and click in order to settle the counting result of the depositing processing (deposit amount).

The input unit 21 of the transaction image generation unit 20 accepts the user's operation of settling the counting result (clicking of the button for settling the counting result) (step S14).

The extraction unit 32 of the transaction processing system 1 extracts a "button" for settling the counting result as a changed graphic from the image data acquired by the acquisition unit 31 (step S15).

The generation unit 33 of the transaction processing system 1 determines that the user has settled the depositing processing in the depositing processing image based on the extracted "button" graphic, and generates the instruction information for settling the depositing processing (step S16). The communication unit 14 transmits the instruction information for settling the depositing processing generated by the generation unit 33 to the mobile terminal 2.

The mobile terminal 2 receives the instruction information for settling the depositing processing (settlement instruction) transmitted from the transaction processing system 1 (step S17).

The mobile terminal 2 transmits the settlement instruction of the depositing processing transmitted from the transaction processing system 1 to the money processing apparatus 3 (step S18).

The money processing apparatus 3 receives the settlement instruction of the depositing processing transmitted from the mobile terminal 2 (step S19).

The money processing apparatus 3 terminates the depositing processing in response to the receipt of the settlement instruction of the depositing processing transmitted from the mobile terminal 2 (step S20).

The display unit 22 of the transaction image generation unit 20 displays the menu image on the display apparatus 13 in response to the settlement operation of the user's counting result by the input unit 21 in step S14 (step S21).

As described above, the transaction processing system 1 comprises the acquisition unit 31 for acquiring the image data of the image displayed on the display apparatus 13 for displaying the content of the transaction, the extraction unit 32 for extracting the character or graphic displayed on the display apparatus 13 from the image data, and the generation unit 33 for analyzing the content represented by the character or graphic and generates the instruction information for causing the money processing apparatus 3 to perform the processing relating to the transaction. Thus, the transaction processing system 1 can generate the instruction information of the money processing apparatus 3 regardless of the specification of the apparatus.

The information processing apparatus 200 and the money processing apparatus 3 may be integrated with each other. For example, the money processing apparatus 3 may comprise an input apparatus such as a keyboard, a mouse and the like, a display apparatus, and a function of the information processing apparatus 200.

Although the click operation has been described above, the present disclosure is not limited thereto. For example, the extraction unit 32 may extract the character or graphic changed by a tap operation or the like on the touchscreen superimposed on the display surface of the display apparatus 13.

In FIG. 2, the mobile terminal 2 communicates with one information processing apparatus 200 and one money processing apparatus 3, but the present disclosure is not limited thereto. The mobile terminal 2 may communicate with a plurality of information processing apparatuses and a plurality of money processing apparatuses.

Figure 7:
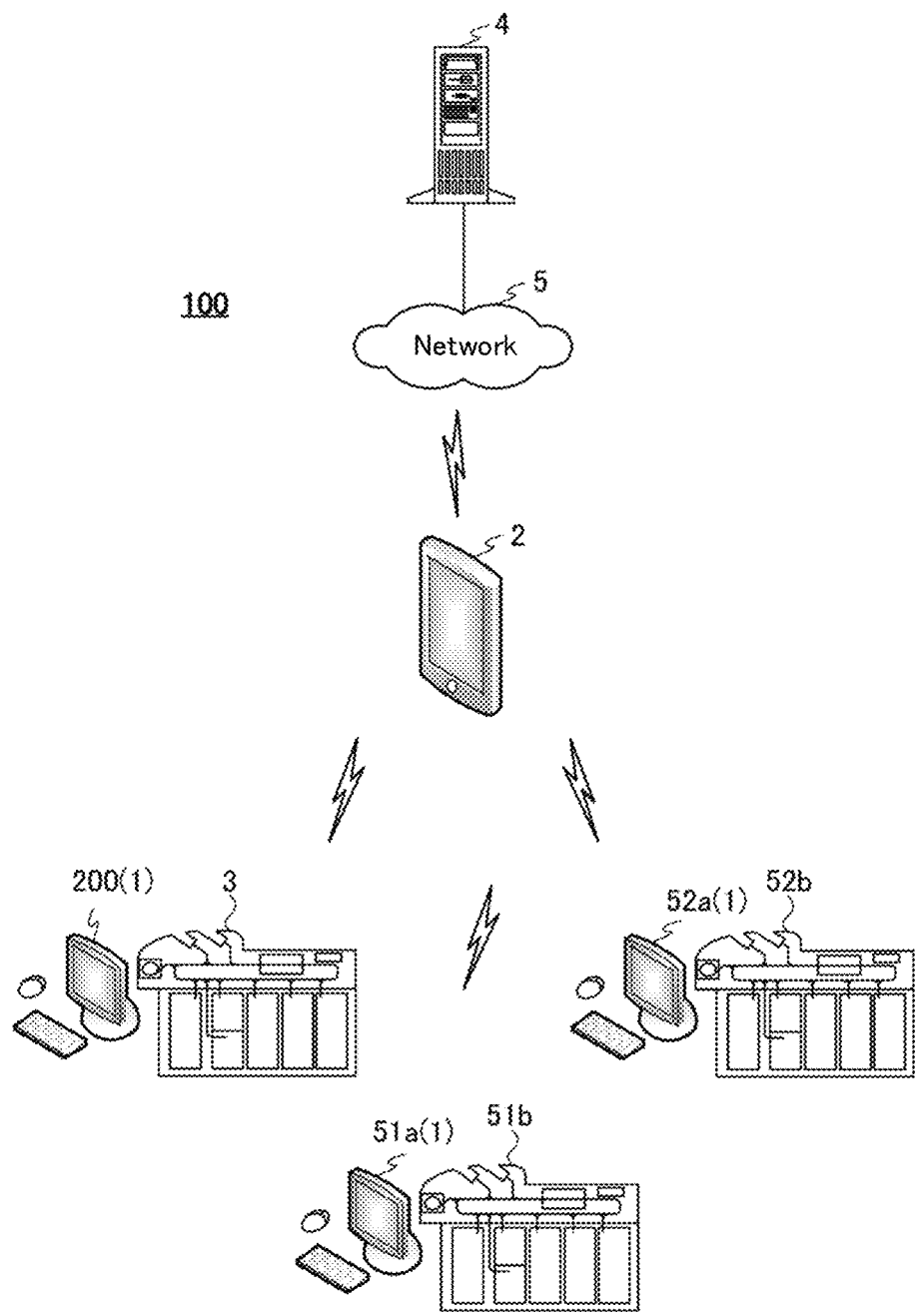
FIG. 7 is a diagram illustrating another configuration example of the transaction processing system according to the first embodiment.

FIG. 7 is a diagram illustrating another configuration example of the money processing system 100 according to the first embodiment; In FIG. 7, the same components as those in FIG. 2 are denoted by the same reference numerals. FIG. 7 illustrates an information processing apparatuses 51a, 52a and money processing apparatuses 51b, 52b. The information processing apparatuses 51a, 52a have the similar function as the information processing apparatus 200. The money processing apparatuses 51b, 52b have the similar function as the money processing apparatus 3.

The information processing apparatus 51a communicates with the money processing apparatus 51b via the mobile terminal 2. The information processing apparatus 51a communicates with the server 4 via the mobile terminal 2.

The information processing apparatus 52a communicates with the money processing apparatus 52b via the mobile terminal 2. The information processing apparatus 52a communicates with the server 4 via the mobile terminal 2.

The mobile terminal 2 communicates with the information processing apparatuses 200, 51a, and 52a. Therefore, the software of the information processing apparatuses 200, 51a, and 52a can be updated by one mobile terminal 2. For example, the mobile terminal 2 can receive the software of the updated information processing apparatuses 200, 51a, and 52a from the server 4, and can transmit the received software to the information processing apparatuses 200, 51a, and 52a for updating. Thus, the user of the information processing apparatuses 200, 51a, and 52a does not have to update the software by operating the information processing apparatuses 200, 51a, and 52a one by one.

The mobile terminal 2 communicates with the money processing apparatuses 3, 51b, and 52b. Therefore, the software of the money processing apparatuses 3, 51b, and 52b can be updated by one mobile terminal 2. For example, the mobile terminal 2 can receive the updated software of the money processing apparatuses 3, 51b, 52b from the server 4, and transmit the received software to the money processing apparatuses 3, 51b, 52b for updating. Thus, the user of the money processing apparatuses 3, 51b, and 52b does not have to update the software by operating the money processing apparatuses 3, 51b, and 52b one by one.

The information processing apparatuses 200, 51a, and 52a are connected to the network 5 via the mobile terminal 2. Thus, the security risk of the information processing apparatuses 200, 51a, and 52a, such as unauthorized access from the network 5, for example, is reduced. The money processing apparatuses 3, 51b, and 52b are connected to the network 5 via the mobile terminal 2. Thus, the security risk of the money processing apparatuses 3, 51b, and 52b, such as unauthorized access from the network 5, for example, is reduced.

Second Embodiment

Figure 8:
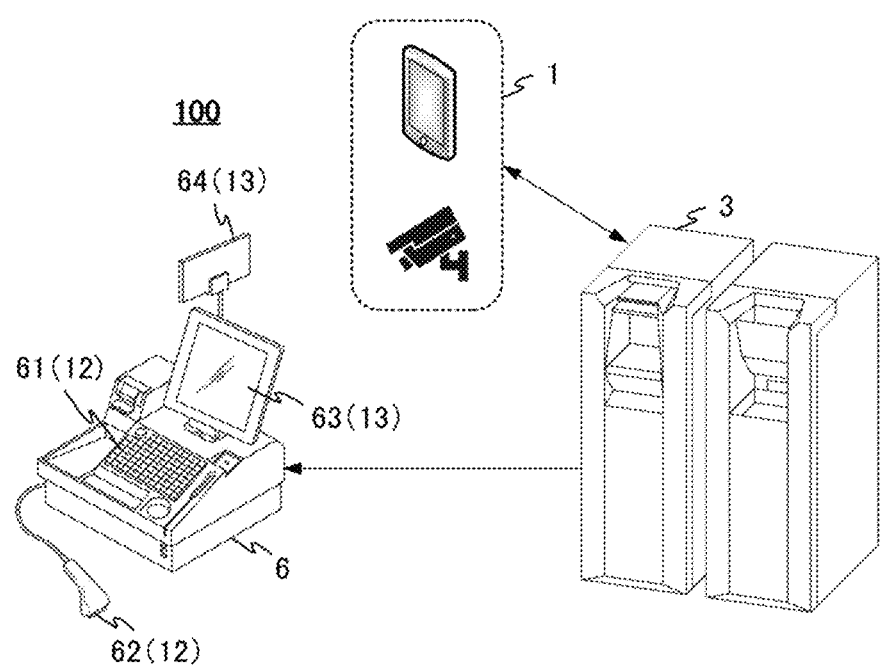
FIG. 8 is a diagram illustrating an example of a transaction processing system according to a second embodiment.

FIG. 8 is a diagram illustrating an example of the money processing system 100 according to the second embodiment. As illustrated in FIG. 8, the money processing system 100 comprises the transaction processing system 1, the money processing apparatus 3, and a POS (Point Of Sale) register 6.

In the second embodiment, the transaction processing system 1, the money processing apparatus 3, and the POS register 6 are installed in, for example, a retail store.

The transaction processing system 1 is, for example, a mobile terminal comprising a camera, or a system comprising a stationary camera. In addition, the transaction processing system 1 may be software incorporated in a mobile terminal comprising a camera or an apparatus comprising a stationary camera, for example. The transaction processing system 1 performs the wireless communication with the money processing apparatus 3 by using a communication method such as Bluetooth or Wi-Fi.

The money processing apparatus 3 performs the depositing processing or the dispensing processing based on the instruction information transmitted from the transaction processing system 1. In the depositing processing, the money processing apparatus 3 accepts the deposit from a merchandise purchaser who intends to purchase a merchandise. In addition, the money processing apparatus 3 dispenses the difference between the amount of the deposit and an merchandise amount as change in the dispensing processing. The change amount may be calculated not by the money processing apparatus 3, but by the transaction processing system 1, for example.

The POS register 6 is an apparatus for acquiring the merchandise amount to be purchased by the merchandise purchaser and displaying the merchandise amount. The POS register 6 comprises the input apparatus 12 and the display apparatus 13. In the example illustrated in FIG. 8, the input apparatus 12 is, for example, a keyboard 61 or a bar code reader 62. In the example illustrated in FIG. 8, the display apparatus 13 is a display 63 or a display 64. In the second embodiment, the transaction processing system 1 is configured as a module separated from the display apparatus 13 and the money processing apparatus 3.

Figure 9:
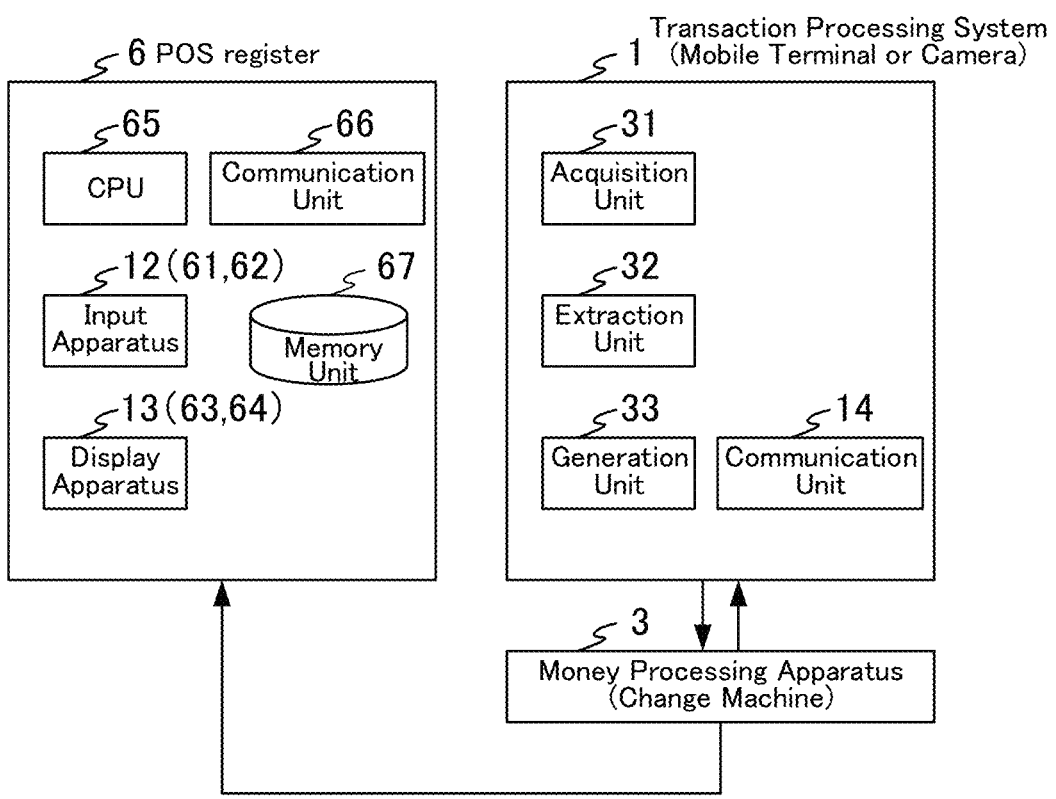
FIG. 9 is a diagram illustrating an example of a functional configuration of the transaction processing system according to the second embodiment.

FIG. 9 is a diagram illustrating an example of a functional configuration of the money processing system 100 according to the second embodiment. As illustrated in FIG. 9, the transaction processing system 1 comprising a mobile terminal or a camera comprises the acquisition unit 31, the extraction unit 32, and the generation unit 33. The transaction processing system 1 may further comprise the communication unit 14 as necessary. As described above, in the second embodiment, the acquisition unit 31, the extraction unit 32, the generation unit 33, and the communication unit 14 are modules integrated with a mobile terminal comprising a camera or a stationary camera. More specifically, the camera comprised in the transaction processing system 1 corresponds to the acquisition unit 31. The function of each component is the same as first embodiment described above, and therefore the description thereof is omitted.

The POS register 6 comprises the input apparatus 12 (the keyboard 61 or the bar code reader 62 illustrated in FIG. 8), the display apparatus 13 (the display 63, 64 illustrated in FIG. 8), the CPU 65, a communication unit 66, and a memory unit 67. Thus, in the second embodiment, the input apparatus 12 and the display apparatus 13 are comprised in the POS register 6, and the POS register 6 and the transaction processing system 1 are not communicatively connected.

The CPU 65 controls entire of the POS register 6 by reading and operating the program stored in the memory unit 67. The keyboard 61 as the input apparatus 12 accepts the input of the merchandise amount by the operation of a store clerk of the retail store or the like. The bar code reader 62 as the input apparatus 12 reads a bar code attached to the merchandise by an operation of the store clerk of the retail store or the like. The input apparatus 12 outputs information relating to the input merchandise amount, or information read from the merchandise to the CPU 65. The data output by the keyboard 61 is output to the CPU 65 via the keyboard interface. The CPU 65 can accept data for the keyboard interface, even data output from a device other than the keyboard. For example, if the bar code reader 62 outputs data in the data format for the keyboard interface, the CPU 65 can receive the data output by the bar code reader 62 via the keyboard interface.

When the information read by the bar code reader 62 is input, the CPU 65 acquires information relating to the merchandise amount by referring to the memory unit 67. The CPU 65 outputs the information relating to the merchandise amount to the display apparatus 13.

The display 63, 64 as the display apparatus 13 display an image based on the merchandise amount output from the CPU 65. For example, the display 63 is a screen referred to by the store clerk of the retail store or the like, and the display 64 is a screen referred to by the merchandise purchaser.

The communication unit 66 acquires information relating to the result of the dispensing processing from the money processing apparatus 3.

The memory unit 67 stores a program for operating the CPU 65. Further, the memory unit 67 stores information relating to the merchandise amount associated with the information read by the bar code reader 62. The information relating to the merchandise amount associated with the information read by the bar code reader 62 may be stored in, for example, a host computer outside the POS register 6 rather than in the memory unit 67. In this case, the CPU 65 acquires the information relating to the merchandise from the host computer by using the communication unit 66.

Figure 10:
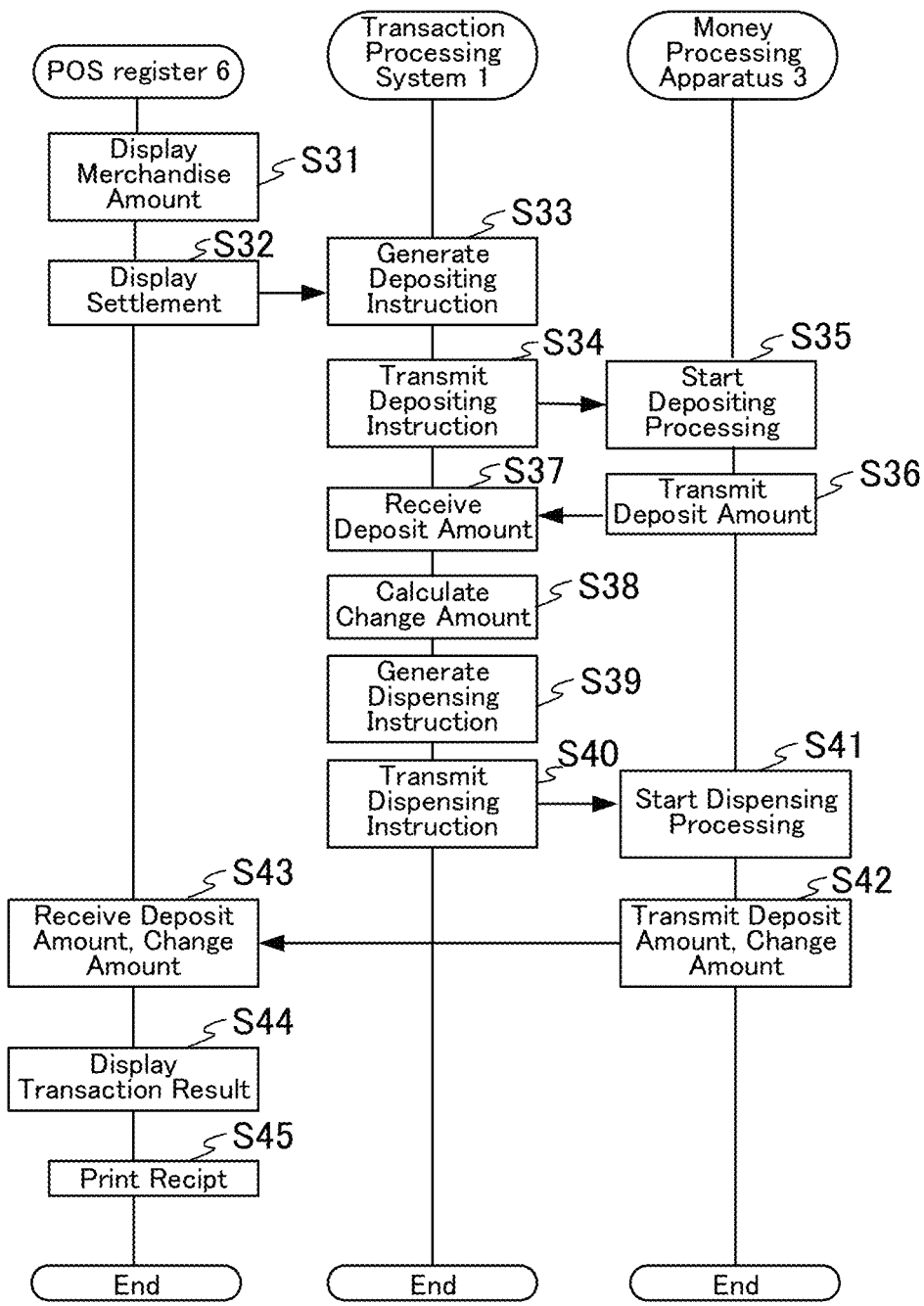
FIG. 10 is a sequence diagram illustrating an action example of the transaction processing system according to the second embodiment.

Next, the operation of the money processing system 100 according to the second embodiment will be described. FIG. 10 is a sequence diagram illustrating an action example of the money processing system 100 according to the second embodiment.

When the merchandise purchaser intends to purchase the merchandise, the store clerk of the retail store, the purchaser himself/herself, or the like operates the POS register 6 and inputs information relating to the merchandise into the POS register 6. The CPU 65 outputs the acquired information relating to the merchandise amount to the display 63 and the display 64 as the display apparatus 13. Thus, the display 63 and the display 64 as the display apparatus 13 display an image comprising the merchandise amount (step S31). The image indicating the merchandise amount may be displayed on only one of the display 63 and the display 64.

FIGS. 11A, 11B and 11C are diagrams for explaining examples of images illustrating the merchandise amount displayed on the display apparatus 13. FIG. 11A illustrates an image 71 in a standby state, that is, a state in which the merchandise amount is not input to the POS register 6. On the other hand, an image 72 comprising the merchandise amount input to the POS register 6 is illustrated in FIG. 11B.

As illustrated in FIG. 11A and FIG. 11B, each of the images 71 and 72 provides columns of "Proceeds", "Deposits", and "Changes". In the standby state illustrated in the drawing 11A, that is, the state before the step S31 in the sequential diagram illustrated in FIG. 10, the columns of "Proceeds", "Deposits", and "Changes" of the image 71 displayed on the display apparatus 13 are all "$0". On the other hand, when the merchandise amount is input, an image in which the column of "Proceeds" is updated by the information relating to the merchandise amount acquired by the POS register 6 is displayed on the display apparatus 13, as the image 72 illustrated in FIG. 11B. In FIG. 11B, the example that the column of the "Proceeds" is "$10.65" is illustrated. In the image 72 illustrated in FIG. 11B, both the columns of "Deposits" and "Changes" remain at "$0".

When it is settled that the merchandise purchaser does not add any more merchandises to be purchased, the CPU 65 causes the display apparatus 13 to display a new image 72 in which two characters "Kakutei" (Japanese word, meaning "settled") are displayed in the column of "Proceeds" (step S32). As illustrated in FIG. 11B, the image 72 displays the characters "Kakutei" in the column of "Proceeds". These characters "Kakutei" can be displayed by operating the keyboard 61 by the store clerk of the retail store, after confirming the presence or absence of the addition of the merchandise to the merchandise purchaser. The characters displayed in the column of "Proceeds" is not limited to the characters "Kakutei", and may be, for example, abbreviated only to the first character "Kaku", or a preset symbol indicating settlement may be displayed.

When the image illustrated in FIG. 11B is displayed on the display apparatus 13, the acquisition unit 31 of the transaction processing system 1 comprising the camera captures the displayed image. In the case where the transaction processing system 1 is a mobile terminal, an image is captured by the store clerk of the retail store or the merchandise purchaser directing the camera of the mobile terminal to the display apparatus 13. In the case where the transaction processing system 1 is an stationary camera, the transaction processing system 1 always captures images displayed on the display apparatus 13 at a predetermined cycle of a few milliseconds to several hundred milliseconds.

The acquisition unit 31 of the transaction processing system 1 acquires the image captured by the camera. The extraction unit 32 analyzes the acquired image, generates information relating to the proceeds from sales from the number displayed in the column of "Proceeds", and determines whether or not the characters "Kakutei" (or the symbol indicating settlement) is displayed in the column of "Proceeds". When it is determined that the characters of "Kakutei" or the symbol is displayed, the generation unit 33 generates the instruction information (the depositing instruction) that comprises information about the merchandise amount and causes the money processing apparatus 3 to perform the depositing processing (step S33). The communication unit 14 transmits the depositing instruction to the money processing apparatus 3 (step S34).

The money processing apparatus 3 as a change machine starts the depositing processing in response to the receipt of the depositing instruction transmitted from the communication unit 14 of the transaction processing system 1 (step S35). As a result, the money processing apparatus 3 is in a state of waiting for depositing. When accepting the deposits by the merchandise purchaser, the money processing apparatus 3 counts the deposit amount, and transmits information relating to the deposit amount to the communication unit 14 of the transaction processing system 1 (step S36).

The communication unit 14 of the transaction processing system 1 receives the information relating to the deposit amount (step S37). Then, the generation unit 33 of the transaction processing system 1 calculates the change amount, which is the difference between the proceeds from sales and the deposit amount (step S38). Here, in the case where the deposit amount is less than the proceeds from sales, the generation unit 33 may generate instruction information for notifying the merchandise purchaser that the deposit amount is insufficient, and transmit the instruction information to the money processing apparatus 3 via the communication unit 14.

In the case where the change amount can be calculated, the generation unit 33 generates instruction information for causing the money processing apparatus 3 to perform the dispensing processing comprising information relating to the change amount (the dispensing instruction) (step S39). The communication unit 14 transmits the dispensing instruction to the money processing apparatus 3 (step S40).

The money processing apparatus 3 starts the dispensing processing, in response to the receipt of the dispensing instruction transmitted from the transaction processing system 1 (step S41). When receiving the dispensing instruction, the money processing apparatus 3 throws out at least one of a banknote and a coin in accordance with the change amount. Then, the money processing apparatus 3 transmits the information relating to the deposit amount and the information relating to the change amount to the POS register 6 (step S42). Here, the change unit 34 comprised in the transaction processing system 1 may be incorporated in the money processing apparatus 3. The change unit 34 changes the information relating to the deposit amount and the information relating to the change amount to the data format for the keyboard interface previously incorporated in the POS register 6. The data for the keyboard interface is, for example, a signal output when pressing each button of the keyboard 61, and means a signal indicating the code of the keyboard 61 corresponding to each key, the code being called a key code.

The communication unit 66 of the POS register 6 acquires the information relating to the deposit amount and the information relating to the change amount from the money processing apparatus 3 (step S43). The CPU 65 of the POS register 6 updates the column of the "Deposits" based on the information relating to the deposit amount, and generates a new picture in which the column of the "Changes" is updated based on the information relating to the change amount. Here, since the information output from the money processing apparatus 3 is the format for the keyboard interface of the POS register 6, the CPU 65 of the POS register 6 can easily generate the updated image in the same way as when the input from the keyboard 61 is processed.

The CPU 65 displays the newly generated image on the display apparatus 13 (step S44). FIG. 11C illustrates an example of the image 73 in which the proceeds from sales is displayed in the column of "Proceeds", the deposit amount is displayed in the column of "Deposits", and the change amount is displayed in the column of "Changes". The POS register 6 prints the receipt by the printing press (step S45). As a result, the transaction relating to the purchase of the merchandise is completed.

The change amount may be calculated by the money processing apparatus 3. In this case, when the depositing instruction is transmitted from the transaction processing system 1 to the money processing apparatus 3, the proceeds is also transmitted together.

The information relating to the deposit amount and the change amount may not be transmitted to the POS register 6. In this case, the money processing apparatus 3 may be provided with the display apparatus and the printer, the proceeds, the deposit amount, and the change amount may be displayed, and the receipt may be issued.

The information relating to the deposit amount and the change amount may be transmitted from the money processing apparatus 3 to the transaction processing system 1. In this case, a display apparatus may be provided with the transaction processing system 1, and the proceeds from sales, the deposit amount, and the change amount may be displayed on the display apparatus. In the case where the transaction processing system 1 is software incorporated in a mobile terminal, the proceeds from sales, the deposit amount, and the change amount may be displayed on the screen of the mobile terminal. In addition, the printer may be provided with the transaction processing system 1, and the receipt may be issued.

As described above, in the money processing system 100 of the second embodiment, since the camera of the transaction processing system 1 reads the purchase amount displayed on the POS register, a dedicated interface is not required between the POS register 6 and the money processing apparatus 3 as a change machine. Therefore, it is possible to suppress the cost of introducing the money processing system 100 to the retail store.

In the money processing system 100 of the second embodiment, the POS register 6 updates the image to be displayed on the display apparatus 13 based on the information from the money processing apparatus 3. At this time, since the information transmitted from the money processing apparatus 3 is based on the format for the keyboard interface of the POS register 6, the CPU 65 of the POS register 6 can easily generate the image for updating. In the second embodiment, unlike the first embodiment, since the transaction processing system 1 does not update the image, the transaction processing system 1 does not need to have the change unit 34.

The first and second embodiments have been described above. The processing function of the transaction processing system 1 according to each of the above embodiments can be realized by a computer. In this case, a program describing the processing contents of the function of the transaction processing system 1 is provided, and the processing function is realized on the computer by executing the program on the computer. The program describing the processing content can be recorded on a computer-readable recording medium.

When the program is distributed, for example, a portable recording medium such as a DVD or a CD-ROM on which the program is recorded is sold. The program may also be stored in the memory apparatus of the server computer and transferred from the server computer to another computer via the network. The computer executing the program stores, for example, the program recorded on the portable recording medium or the program transferred from the server computer in its own memory apparatus. Then, the computer reads the program from its own memory apparatus and performs the processing according to the program.

The mobile terminal 2 may be, for example, a terminal apparatus such as a personal computer. The money processing system 100 may also be, for example, an ATM (Automatic Teller Machine). In the ATM, the display apparatus 13, the transaction processing system 1, and the money processing apparatus 3 are integrated into one housing. In the ATM, an application for operating the display apparatus 13 or a display content may be changed or the display apparatus itself may be replaced by a company that operates the ATM. According to the present disclosure, even if the display apparatus 13 is replaced, it is not necessary to change the software or the interface of the money processing apparatus 3. The money processing system 100 may also be located in a bank lobby. The money processing system 100 may also be located in a facility such as a store.

The invention claimed is:

1. A transaction processing system, comprising:
processing circuitry configured to
acquire, at a predetermined cycle, image data of an image displayed on a display apparatus for displaying a content of a transaction;
extract, from the image data, a change of a character or graphic displayed on the display apparatus;
analyze, after the character or graphic is changed, a content represented by the character or graphic; and
generate instruction information, based on the analyzed content, for controlling a money processing apparatus to perform processing relating to the transaction.

2. The transaction processing system according to claim 1, further comprising:
a camera provided separate from the display apparatus, the camera capturing a captured image of the image displayed on the display apparatus, wherein
the processing circuitry acquires the image data according to the captured image from the camera.

3. The transaction processing system according to claim 1, wherein
the processing circuitry is a module different from the money processing apparatus, and
the processing circuitry is configured to communicate with the money processing apparatus.

4. The transaction processing system according to claim 3, wherein the processing circuitry communicates with the money processing apparatus via a mobile terminal.

5. The transaction processing system according to claim 1, wherein the processing circuitry is further configured to generate change information for changing the image based on a processing result of the money processing apparatus.

6. The transaction processing system according to claim 5, wherein the processing circuitry is further configured to decide a position to change the image based on the analyzed content.

7. The transaction processing system according to claim 5, wherein
the processing circuitry generates the change information for a keyboard interface, and
the change information is accepted by the display apparatus.

8. A transaction processing method, comprising:
acquiring image data of an image displayed on a display apparatus for displaying a content of a transaction;
extracting, from the image data, a character or graphic displayed on the display apparatus;
analyzing, by processing circuitry, a content represented by the character or graphic;
generating instruction information, by the processing circuitry and based on the analyzed content, for controlling a money processing apparatus to perform processing relating to the transaction; and
generating change information for changing the image based on a processing result of the money processing apparatus, wherein the change information is data of a data format for a keyboard interface, and
the change information is accepted by the display apparatus.

9. The transaction processing method according to claim 8, wherein
the acquiring includes capturing, by a camera separate from the display apparatus, a captured image of the image displayed on the display apparatus, and
the image data is acquired according to the captured image.

10. The transaction processing method according to claim 8, wherein the generating the instruction information comprises analyzing the content after the character or graphic is changed and generating the instruction information according to the analyzed content.

11. The transaction processing method according to claim 8, further comprising communicating with a module different from the money processing apparatus and the money processing apparatus.

12. The transaction processing method according to claim 11, wherein the communicating is performed via a mobile terminal.

13. The transaction processing method according to claim 8, further comprising deciding a position to change the image based on the analyzed content.

14. A non-transitory computer-readable medium storing computer executable instructions which, when executed by a computer, cause the computer to perform a process comprising:
acquiring image data of an image displayed on a display apparatus for displaying a content of a transaction;
extracting, from the image data, a character or graphic displayed on the display apparatus;
analyzing a content represented by the character or graphic;
generating instruction information, based on the analyzed content, for controlling a money processing apparatus to perform processing relating to the transaction;
generating change information for changing e image based on a processing result of the money processing apparatus; and
deciding a position to change the image based on the analyzed content.

15. The non-transitory computer readable medium according to claim 14, wherein the process further comprises:
analyzing the content after the character or graphic is changed, and
generating the instruction information according to the analyzed content.

16. The non-transitory computer readable medium according to claim 14, wherein the process further comprises communicating with a module different from the money processing apparatus and the money processing apparatus.

* * * * *